(12) United States Patent  
Lee

(10) Patent No.: US 7,997,809 B1
(45) Date of Patent: Aug. 16, 2011

(54) DEHUMIDIFIER CAPS FOR CAMERAS

(76) Inventor: Chung-Ho Jim Lee, Los Angeles, CA (US)

( * ) Notice: Subject to any disclaimer, the term of this patent is extended or adjusted under 35 U.S.C. 154(b) by 0 days.

(21) Appl. No.: 12/848,144

(22) Filed: Jul. 31, 2010

(51) Int. Cl.
*G03B 17/00* (2006.01)
(52) U.S. Cl. ......................................... 396/448
(58) Field of Classification Search .................. 396/448
See application file for complete search history.

(56) References Cited

U.S. PATENT DOCUMENTS

| | | | |
|---|---|---|---|
| 2,915,404 A * | 12/1959 | Tessmer et al. | 426/118 |
| 5,522,204 A | 6/1996 | Wood | |
| 5,813,564 A * | 9/1998 | Luo | 220/522 |
| 6,158,580 A * | 12/2000 | Davis | 206/204 |
| 6,986,807 B2 | 1/2006 | Brunk | |
| 7,037,393 B2 * | 5/2006 | Drummond et al. | 156/73.1 |
| 2004/0119872 A1 * | 6/2004 | Ichikawa et al. | 348/360 |
| 2007/0157658 A1 | 7/2007 | Kiblawi | |
| 2010/0102020 A1 * | 4/2010 | Sebille et al. | 215/44 |

FOREIGN PATENT DOCUMENTS

CA 2555742 4/2009

OTHER PUBLICATIONS

DDCAP, http://www.pwtec.com/ddcap.htm

* cited by examiner

*Primary Examiner* — W. B. Perkey
*Assistant Examiner* — Linda Smith

(57) ABSTRACT

A camera cap assembly removes moisture from a camera rear lens and/or a camera body. The camera cap assembly includes a main body that has a front end, a rear end, and an inner divider having a number of openings. The camera cap assembly also includes a desiccant holder cap at the rear end of the main body and a storage sealing cap at the front end. A desiccant chamber is defined between the desiccant holder cap and the inner divider for storing a dehumidifying component. The sealing storage cap is secured to the front end of the main body when the camera cap assembly is not in use. The camera cap assembly is to be attached to a camera rear lens or a camera body, without the storage cap, via bayonet mount and a sealing ring.

17 Claims, 7 Drawing Sheets

DEHUMIDIFIER CAPS FOR CAMERAS

TECHNICAL FIELD

Embodiments of the present invention relate to camera accessories, and more specifically, to camera caps that remove humidity from air when a camera or a camera lens is in storage.

BACKGROUND

A camera lens (also known as photographic lens or objective lens) is an assembly of optical lenses used in conjunction with a camera body to make images of objects either on photographic films or on other image storage media. Many of the camera lenses available today can be interchanged with lenses of different focal lengths, apertures, or other properties. When camera lenses and other camera equipment are not in use, they are optimally stored at a relative humidity (RH) of between 35% to 45%.

When a camera lens is detached from a camera body and placed in storage, moisture may build up on the many optical elements inside the lens and may lead to the growth of fungus inside the lens and on the optical elements, thereby impairing the optical performance of the lens in humid climates. Likewise, a camera body in storage with its lens detached may be susceptible to moisture buildup on its inner optical elements and mirror assembly. Temperature change may also cause moisture buildup inside the lens and the camera. Condensation will form when warm humid air comes into contact with cool objects. For example, when a user comes indoors after using a lens in the cold outdoors, the temperature and RH change would cause condensation build up inside the camera body and the lens. Therefore, there is a need to reduce the moisture in the camera body and the lens.

BRIEF DESCRIPTION OF THE DRAWINGS

The present invention is illustrated by way of example, and not by way of limitation, in the figures of the accompanying drawings and in which:

FIG. 5 illustrates a front perspective view of a camera cap assembly with the sealing storage cap on.

DETAILED DESCRIPTION

Described herein is a camera cap assembly that functions as a dehumidifier device. The camera cap assembly removes moisture from inside a camera lens and/or a camera body. In one embodiment, the camera cap assembly includes a main body that has a front end, a rear end, and an inner divider between the front end and the rear end. The inner divider has a number of openings. The camera cap assembly also includes a desiccant holder cap at the rear end of the main body and a storage sealing cap at the front end. A desiccant chamber is defined between the desiccant holder cap and the inner divider for storing a dehumidifying component. The sealing storage cap is secured to the front end of the main body when the camera cap assembly is not in use. The camera cap assembly is to be attached to a camera rear lens or a camera body, without the storage cap, via bayonet mount and a sealing ring.

The camera cap assembly described herein can be easily attached to and removed from a camera rear lens and/or a camera body, and, at the same time, effectively serves as a dehumidification device.

Figure 1:
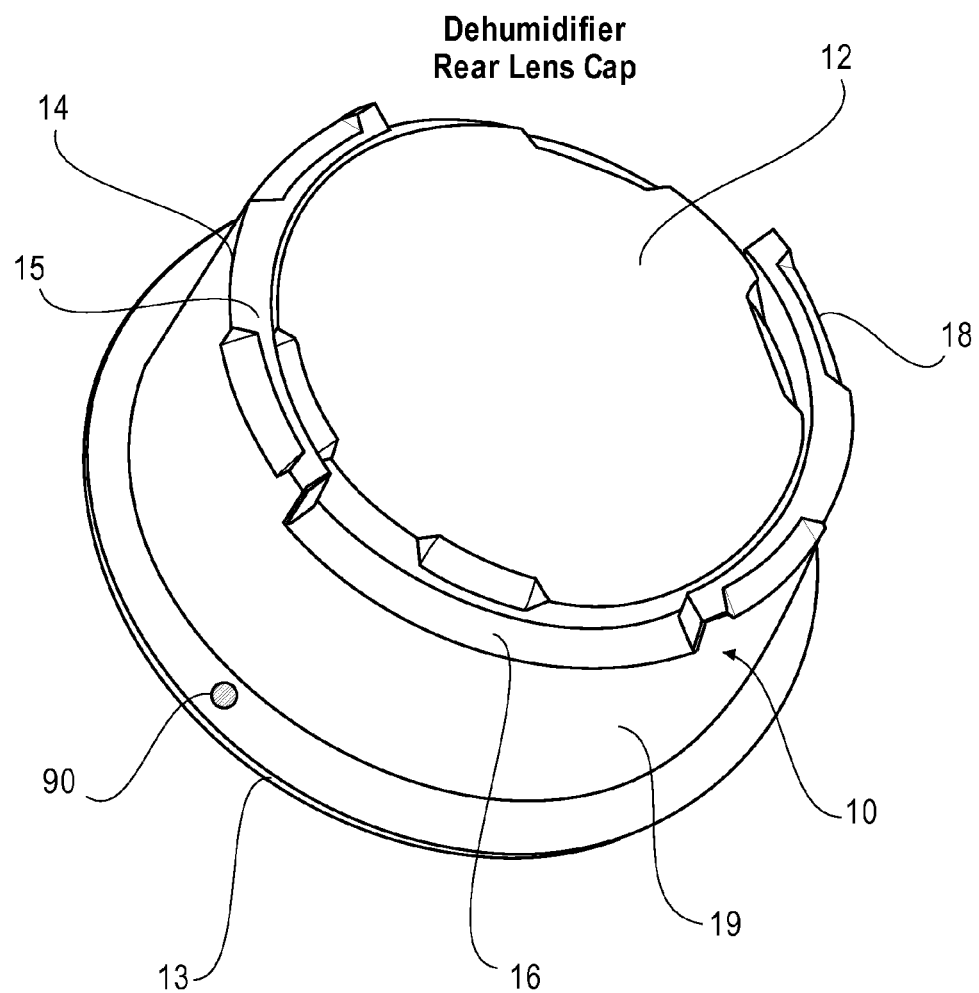
FIG. 1 illustrates one embodiment of a camera cap assembly for a camera rear lens, as viewed from the back surface of the camera cap assembly.

FIG. 1 illustrates one embodiment of a camera cap assembly 10 for a camera rear lens, as viewed from the back surface of the camera cap assembly 10. The camera cap assembly 10 is to be attached to a camera rear lens (the end of a camera lens facing toward a camera body when attached to the camera body). The camera cap assembly 10 includes a front end, to which a sealing storage cap 13 is attached, and a rear end, to which a desiccant holder cap 12 is attached. In the following description, the direction of the camera cap assembly 10 facing away from the camera rear lens is referred to as the "rear" or "back" direction, and the direction facing toward the camera rear lens is referred to as the "front" direction. Thus, when the camera cap assembly 10 is attached to a camera rear lens, its front end is attached to and faces toward the camera rear lens and its rear end faces away the camera rear lens.

The sealing storage cap 13 is removed when the camera cap assembly 10 is attached to a camera lens. The sealing storage cap 13 can be placed on the camera cap assembly 10 when the camera cap assembly 10 is in storage to prevent absorption of excess moisture buildup when the camera cap assembly is not in use.

In one embodiment, the rear periphery 14 at the rear end of the camera cap assembly 10 includes a number of (e.g., two) raised regions 15 and a number of (e.g., two) recess regions 16. Each raised region 15 include one or more grips 18 to ease the installation and removal of the camera cap assembly 10 onto and from a camera rear lens. Each grip 18 includes a molded gripping surface, which slopes downward toward the outer edge of the rear periphery 14. When the camera cap assembly 10 stands on its front end with the desiccant holder cap 12 securely attached to the camera cap assembly 10, the height of the raised regions 15 at the front periphery 14 may be the same as, or slightly below, the height of the desiccant holder cap 12. The height of each recess regions 16 is substantially lower than the height of the desiccant holder cap 12 such that each recess region 16 exposes the outer periphery of the desiccant holder cap 12.

The camera cap assembly 10 also includes a main body 19 between the front end and the rear end of the camera cap assembly 10. In one embodiment, the main body 19 has a cylindrical shape. Other shapes may be used in alternative embodiments. In one embodiment, the diameter of the cylindrical portion of the main body 19 is smaller than the diameter of the sealing storage cap 13.

In one embodiment, the camera cap assembly 10 has one or more alignment markings 90 on the outer surface at or near the front end to aid in alignment for proper installation. The alignment markings 90 may be located on a front periphery of the camera cap assembly 10, where the front periphery being the part of the assembly 10 that protrudes from the cylindrical portion of the main body 19. Further details about the alignment markings 90 will be described later.

Figure 2:
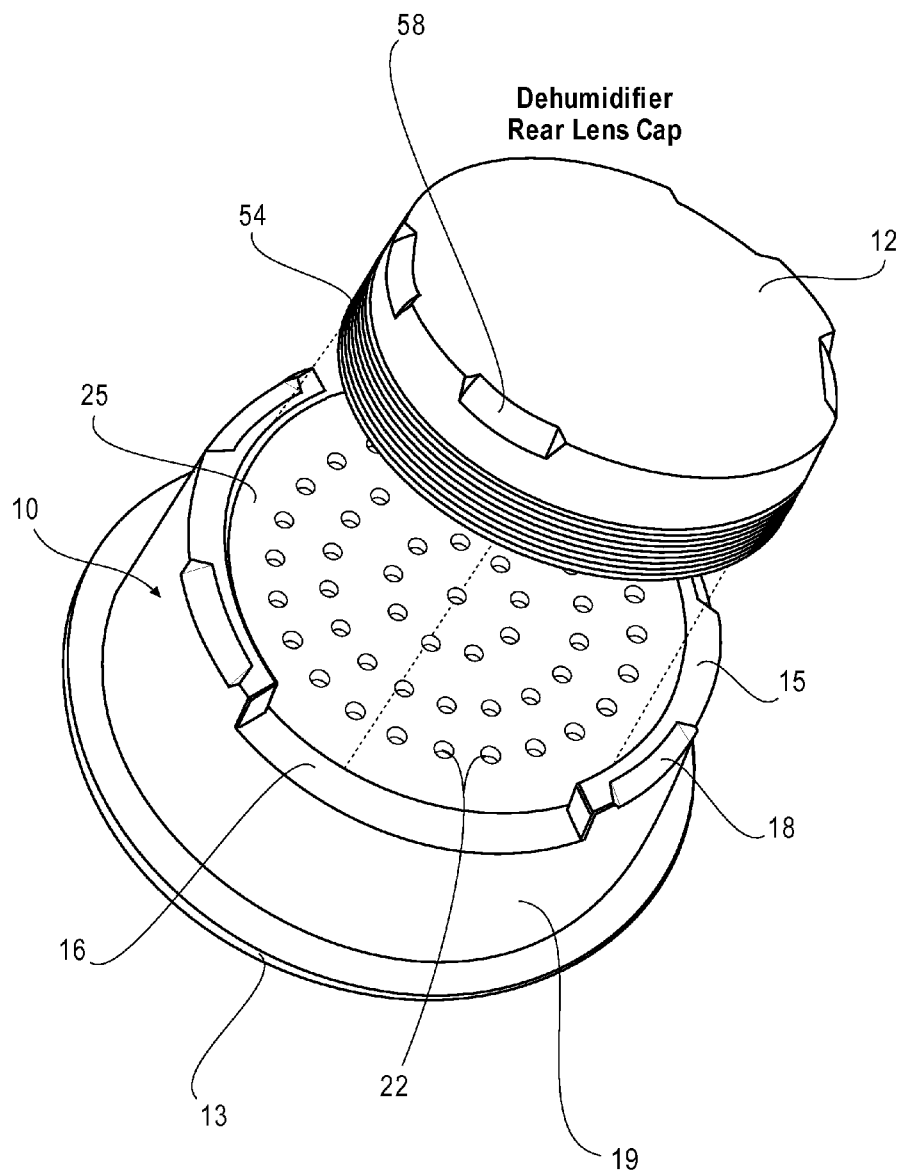
FIG. 2 illustrates a back perspective view of the camera cap assembly of FIG. 1 when a desiccant holder cap is detached from the main body of the assembly.

FIG. 2 illustrates a back perspective view of the camera cap assembly 10 of FIG. 1 when the desiccant holder cap 12 is detached. The detachment of the desiccant holder cap 12 exposes the rear side of an inner divider 25 located within the main body 19 between the front end and the rear end of the camera cap assembly 10. The inner divider 25 includes a number of openings 22 for moisture passage. The dimension of each opening may be, for example, in the range of 0.05 mm to 10 mm in diameter. The inner wall of the main body 19 may include screw threads (which are shown as screw threads 23 in FIG. 3) to allow the desiccant holder cap 12 to be screwed onto the main body 19. In alternative embodiments, the desiccant holder cap 12 may be secured onto the main body 19 using other mechanisms; for example, friction, magnets, hook and loop devices, molded deformable snap locks, etc.

In one embodiment, the desiccant holder cap 12 includes screw threads 54 for screwing the cap 12 onto the main body 19. The desiccant holder cap 12 may include a number of grips 58 at the outer edge for ease of installation and removal of the desiccant holder cap 12 onto and from the main body 19. Each grip may include a molded gripping surface, which slopes downward toward the outer edge of the desiccant holder cap 12.

When the desiccant holder cap 12 is attached to the main body 19, the rear side of the inner divider 25 and the inner cavity of desiccant holder cap 12 define a desiccant chamber for holding desiccant or other drying agents (collectively referred to as "desiccant"). Examples of the desiccants include, but are not limited to, color indicating silica gel, silicon dioxide (SiO2), calcium sulfate, calcium chloride, salt, paper, wood, rice, montmorillonite clay, etc. When the desiccant is placed in the desiccant chamber and the camera cap assembly 10 is attached to a camera rear lens, the moisture in the camera rear lens can pass through the openings 22 to be absorbed by the desiccant. In one embodiment, the desiccant may be contained in a bag as to not allow powder or dust to escape into the camera rear lens through the openings 22.

Figure 3:
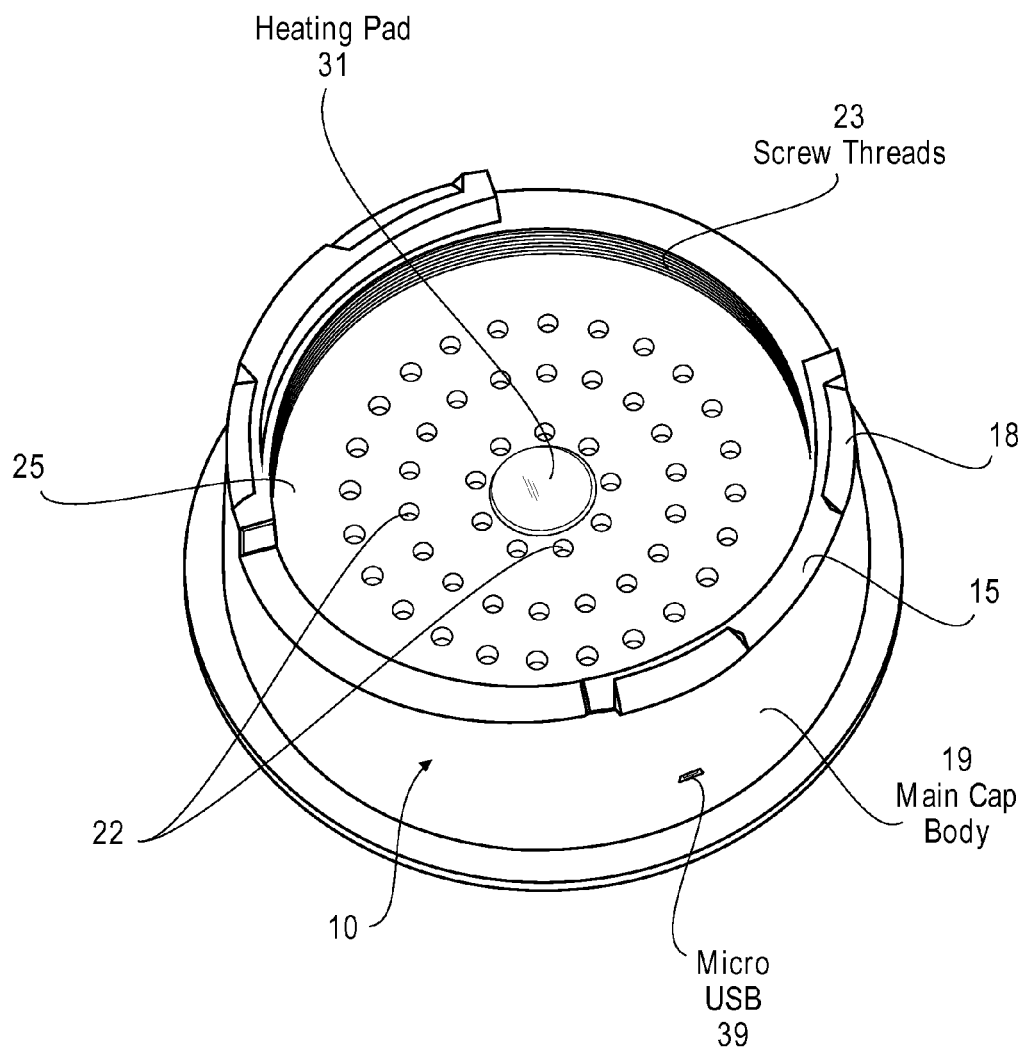
FIG. 3 illustrates another embodiment of a camera cap assembly for a camera rear lens, as viewed from the back surface of the main body when the desiccant holder cap is detached.

FIG. 3 illustrates another embodiment of the camera cap assembly 10 for a camera rear lens, as viewed from the back surface of the main body 19 when the desiccant holder cap 12 is detached. In this alternative embodiment, an electronic heating element (e.g., a heating pad 31) may be used in place of chemical or organic desiccants. The heating element may be located on the inner divider 25, or other locations in the desiccant chamber. The heating element converts electricity into heat through the process of Joule heating, during which electric current flowing through the heating element encounters resistance, resulting in heating of the element. An example of the heating element is made of Nichrome 80/20 (i.e., 80% nickel and 20% chromium) wire, ribbon, or strip. An appropriate voltage can be applied to the heating element to produce heat, thereby creating a drying effect. In one embodiment, the heating element may receive power from a battery (not shown) located in a compartment next to the heating element. Alternatively, the heating element may be powered through a dedicated micro Universal Serial Bus (USB) port 39 with a plug-in charging cable attached to an external charger. In the description hereinafter, the term "dehumidifying component" may be used to refer to an electronic heating element, chemical or organic desiccants or other drying agent.

Figure 4:
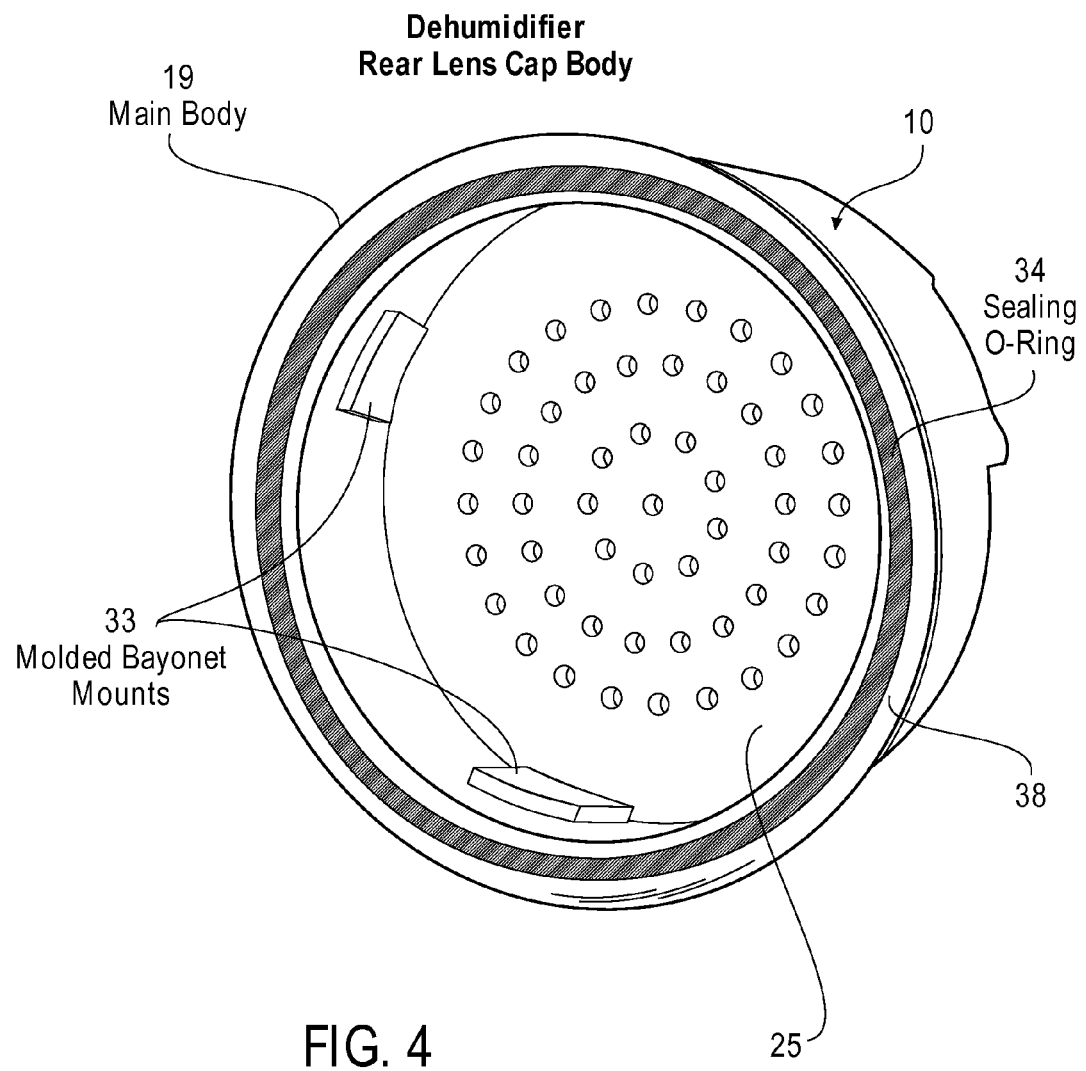
FIG. 4 illustrates a front perspective view of a camera cap assembly when a sealing storage cap is removed.

FIG. 4 illustrates a front perspective view of the camera cap assembly 10 of FIG. 1 when the sealing storage cap 13 is removed. The removal of the sealing storage cap reveals the front side of the dividing wall 25 with the openings 22. The front side of the dividing wall 25 and the inner wall of the main body 19 defines a front chamber to accommodate protruding parts of a camera rear lens. In one embodiment, the inner wall of the main body 19 that surrounds the front chamber includes a bayonet mount element 33. The bayonet mount element 33 includes molded bayonet prongs to engage the coupling element of the camera rear lens for locking the camera cap assembly 10 to the camera rear lens. In one embodiment, the bayonet mount element 13 is lens-specific to ensure a proper fit. That is, the bayonet mount element 13 is designed to match the corresponding coupling element in the camera rear lens to be attached.

To improve the sealing of the camera cap assembly 10 to the camera rear lens, the camera cap assembly 10 may include a sealing o-ring 34 at the front periphery 38 of the assembly 10. The use of the sealing o-ring 34 provides tighter seal between the camera cap assembly 10 and the camera rear lens in order to absorb only targeted moisture; that is, only the moisture from the camera lens. The sealing o-ring 34 may be made of silicone, rubber, or other elastomers. In one embodiment, the front periphery 38 of the camera cap assembly 10 may include a flush ring-shaped surface with the sealing o-ring 34 embedded on the surface. In one embodiment, the front periphery 38 protrudes from the main cylindrical portion of the main body 19 to provide a wide surface for accommodating the sealing o-ring 34. The wide surface improves the sealing of the camera cap assembly 10 to the camera equipment to be attached (e.g., camera rear lens or the sealing storage cap 13).

Figure 5:
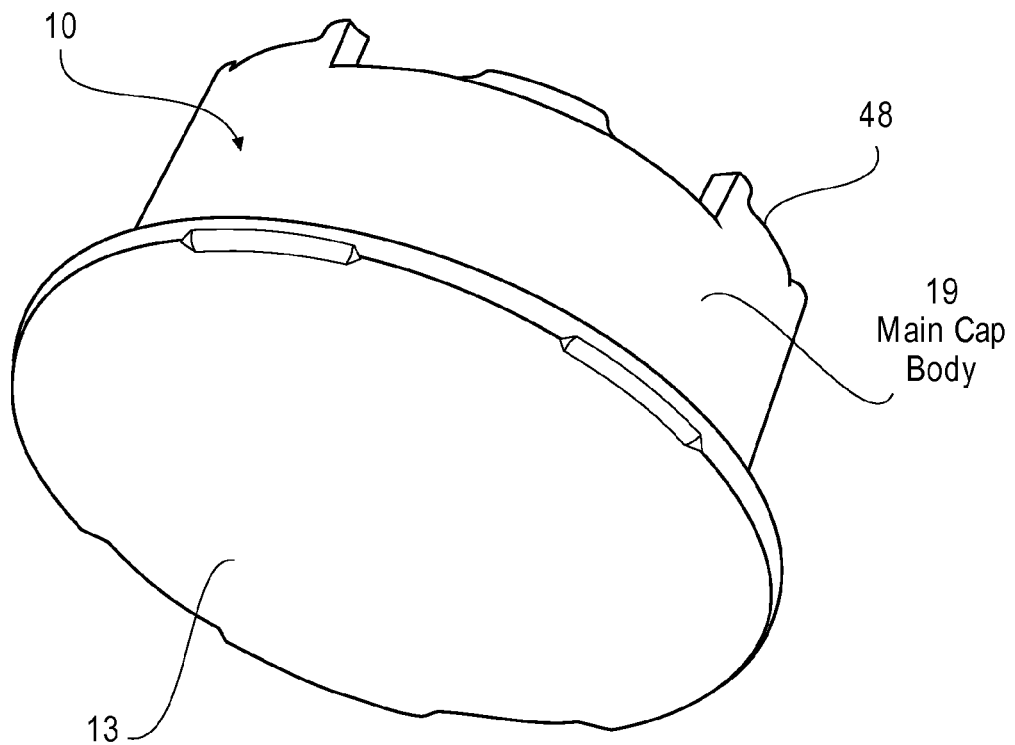

FIG. 5 illustrates a front perspective view of the camera cap assembly 10 of FIG. 1 with the sealing storage cap 13 on. The sealing storage cap 13 is attached to the front end of the main body 19 of the camera cap assembly 10 by having a coupling element that couples to the bayonet mount element 33. In one embodiment, the diameter of the sealing storage cap 13 is greater than the diameter of the main body 19 to make installation and removal easier. The sealing storage cap 13 may include a number of grips 48 at the outer edge for ease of installation and removal of the sealing storage cap 13 onto and from the main body 19. Each grip may include a molded gripping surface, which slopes downward toward the outer edge of the sealing storage cap 13.

When a camera lens is detached from a camera body and both the lens and camera body are in storage, moisture may enter into not only the lens but also the camera body. A variation of the camera cap assembly 10 may be used to cover the cavity of the camera body after removal of the lens, and dehumidify the internal components of the camera body.

Figure 6:
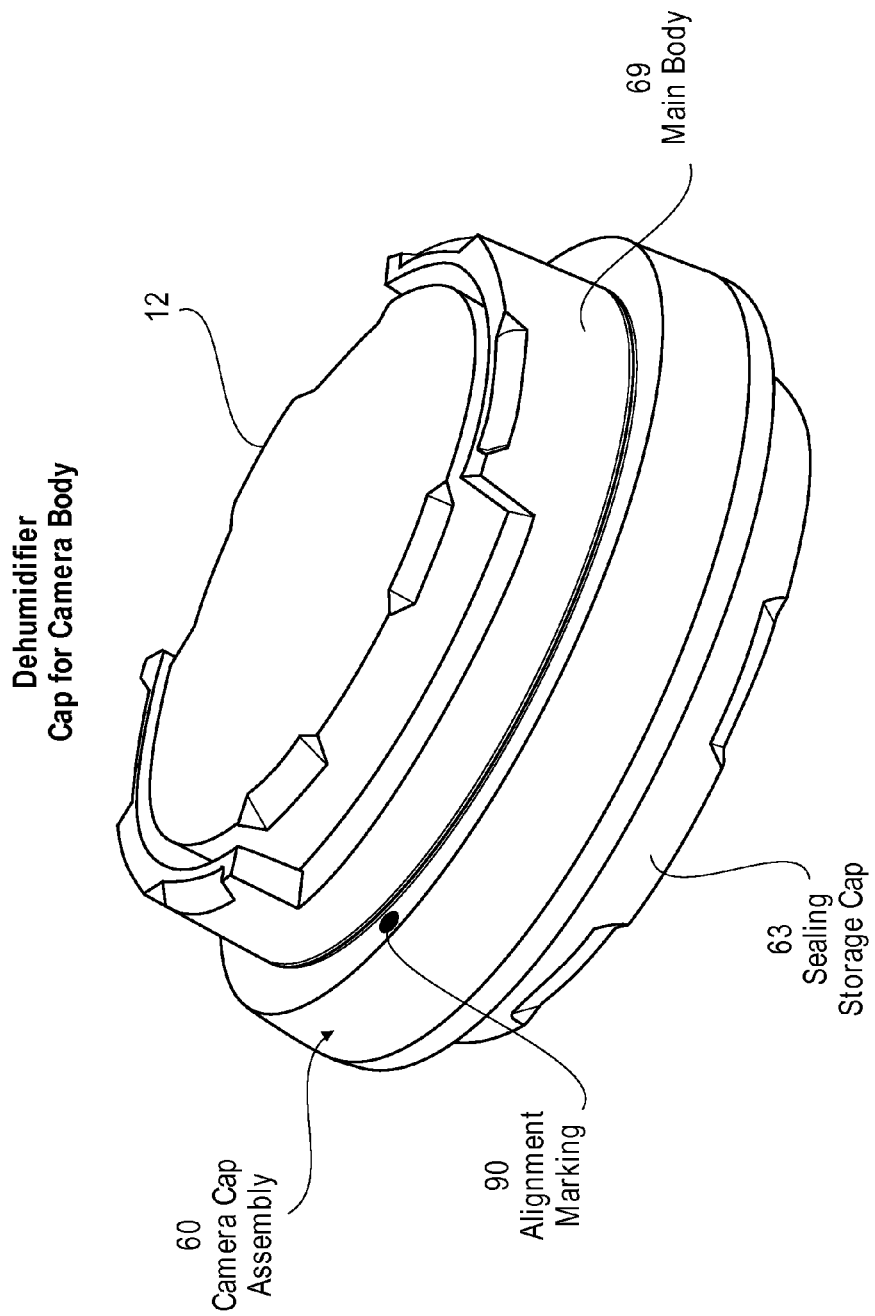
FIG. 6 illustrates an embodiment of a camera cap assembly for use on a camera body.

FIG. 6 illustrates an embodiment of a camera cap assembly 60 for use on a camera body. The camera cap assembly 60 includes a front end, to which a sealing storage cap 63 is attached, and a rear end, to which a desiccant holder cap 12 is attached. The same desiccant holder cap 12 can be used on the camera cap assembly 60 (for a camera body) as well as the camera cap assembly 10 (for a camera rear lens). The direction of the camera cap assembly 60 facing away from the camera body is referred to as the "rear" direction and the direction facing toward the camera body is referred to as the "front" direction.

The structure of the camera cap assembly 60 is the same as that of the camera cap assembly 10, except some differences in dimensions and the coupling element used to attach to the camera body. That is, internally, the camera cap assembly 60 also includes an inner divider that separates a desiccant chamber (for desiccant/drying agent/electronic heating element storage) from a front chamber, with a number of openings on the inner divider. For simplicity of the description, those features of the camera cap assembly 60 that are the same as the camera cap assembly 10 are not repeated.

In one embodiment, the main body 69 is "shorter" in height than the main body 19 of the camera cap assembly 10 (that is, the dimension of the main body 69 measured from the front end to the rear end). The different dimensions is due to different clearance issues relating to lens and camera body requirements. Similar to the camera cap assembly 10, the camera cap assembly 60 is attached to a camera body using bayonet mount and a sealing o-ring (with the sealing storage cap 63 removed). Although not shown in FIG. 6, the specific bayonet mount element on camera cap assembly 60 may be different from the bayonet mount element 33 of FIG. 4. For example, the bayonet mount element on camera cap assembly 60 may include bayonet receptors to couple to the bayonet prongs on the camera body.

In the embodiments shown in FIG. 1 and FIG. 6, each of the camera cap assemblies 10 and 60 has alignment markings 90 on the outer surface at or near the front end to aid in alignment for proper installation. The alignment markings 90 may be located on the front periphery that protrudes from cylindrical portion of the main body 19 (or 69). The color of the alignment markings 90 may correspond with camera body/lens manufacturer marking colors. The alignment markings 90 may include alignment dots that align with the corresponding dots on the camera body/lens after the assembly 10 or 60 is slotted in place and then turned to lock the bayonet mount (e.g., the bayonet mount element 33 of FIG. 4).

Figure 7:
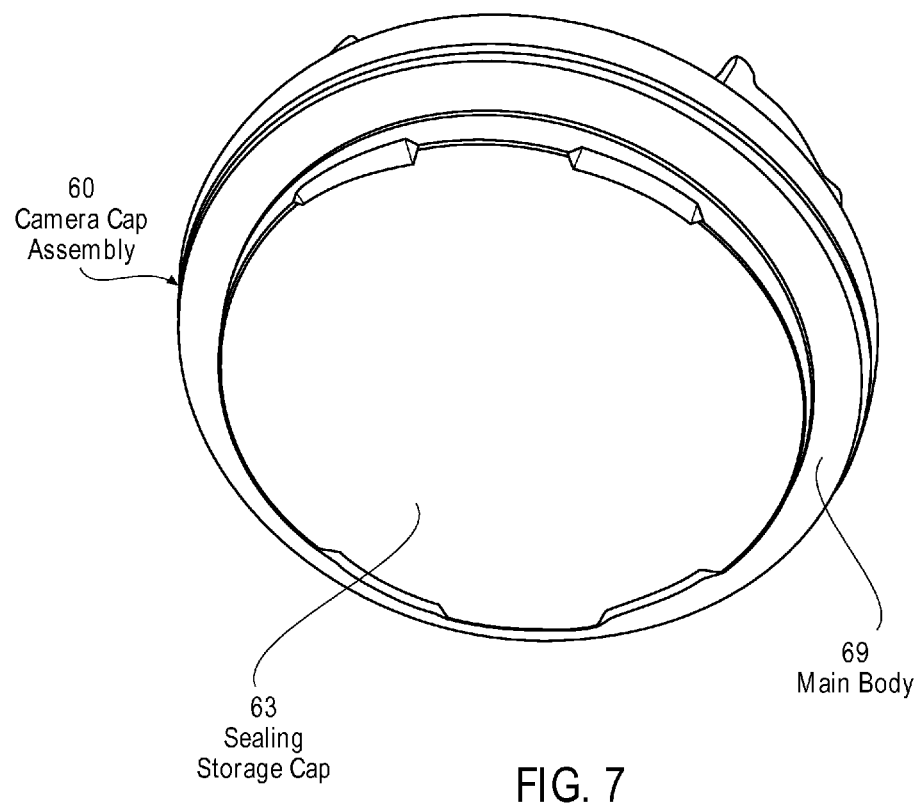
FIG. 7 illustrates a front perspective view of the camera cap assembly of FIG. 6.

FIG. 7 illustrates a front perspective view of the camera cap assembly 60 of FIG. 6. This figure shows the features of the sealing storage cap 63 and its relative dimension with respect to the main body 69. In this embodiment, the sealing storage cap 63 is smaller in diameter than the main body 69. The diameter of the sealing storage cap 63 may be different for different camera brands and designs.

Thus, embodiments of a camera cap assembly for removing moisture from a camera rear lens and/or a camera body have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A camera cap assembly comprising:
    a main body that has a front end, a rear end, and an inner divider that is between the front end and the rear end and comprises a plurality of openings;
    a holder cap to be secured to the rear end of the main body, wherein a chamber is defined between the holder cap and the inner divider for storing a dehumidifying component; and
    a storage cap to be secured to the front end of the main body.

2. The camera cap assembly of claim 1, wherein the storage cap is secured to the front end of the main body by bayonet mount.

3. The camera cap assembly of claim 1, wherein the storage cap is secured to the front end of the main body when the camera cap assembly is not attached to a camera body or a lens of the camera, and to be removed when the camera cap assembly is attached to the camera body or the lens of the camera.

4. The camera cap assembly of claim 1, wherein the front end of the main body comprises a sealing ring embedded on a front periphery of the front end.

5. The camera cap assembly of claim 4, wherein the front periphery of the front end comprises the sealing ring embedded on a flush ring-shaped surface.

6. The camera cap assembly of claim 1, wherein the dehumidifying component comprises chemical or organic desiccants.

7. The camera cap assembly of claim 1, wherein the dehumidifying component comprises an electronic heating element.

8. The camera cap assembly of claim 1, wherein the rear end of the main body comprises one or more recess regions at the rear periphery, each recess region to expose an outer side of the holder cap.

9. The camera cap assembly of claim 1, wherein the rear end of the main body comprises one or more raised regions at the rear periphery, each raised region comprising one or more molded grips.

10. The camera cap assembly of claim 1, wherein the camera cap assembly is to be attached to a camera body via bayonet mount and a sealing ring when the camera body is in storage without a camera lens.

11. The camera cap assembly of claim 1, wherein the camera cap assembly is to be attached to a camera rear lens via bayonet mount and a sealing ring when the camera rear lens is not in use.

12. The camera cap assembly of claim 1, wherein the main body and the holder cap include screw threads to allow the holder cap to be screwed onto the main body.

13. A camera cap assembly comprising:
    a main body that has a front end, a rear end, and an inner divider that is between the front end and the rear end and comprises a plurality of openings;
    a holder cap secured to the rear end of the main body, wherein a chamber is defined between the holder cap and the inner divider for storing a dehumidifying component;
    a storage cap secured to the front end of the main body when the camera cap assembly is not in use,
    wherein the camera cap assembly is to be attached to a camera rear lens or a camera body, without the storage cap, via bayonet mount and a sealing ring, the sealing ring embedded on a front periphery of the front end.

14. The camera cap assembly of claim 13, wherein the dehumidifying component comprises chemical or organic desiccants.

15. The camera cap assembly of claim 13, wherein the dehumidifying component comprises an electronic heating element.

16. The camera cap assembly of claim 15, wherein the electronic heating element is powered by a battery that is located in a compartment within the chamber.

17. The camera cap assembly of claim 15, wherein the electronic heating element is powered by an external charger though a micro Universal Serial Bus (UBS) port located on the main body.

* * * * *